United States Patent [19]

Staurseth

[11] Patent Number: 4,630,373
[45] Date of Patent: Dec. 23, 1986

[54] RETRACTABLE UTILITY SAW

[76] Inventor: Robert A. Staurseth, Rte. #1, Box 426, Poplar, Wis. 54864

[21] Appl. No.: 728,340

[22] Filed: Apr. 29, 1985

[51] Int. Cl.⁴ ............................................ B23D 45/00
[52] U.S. Cl. ........................................ 30/514; 30/162
[58] Field of Search ................ 30/162, 166, 295, 335, 30/523, 524, 517, 514; 7/144

[56] References Cited

U.S. PATENT DOCUMENTS

| 792,719 | 6/1905 | Molkenthin | 7/144 X |
| 845,792 | 3/1907 | Jenkins | 30/162 |
| 2,640,260 | 6/1953 | Taylor et al. | 30/162 |
| 2,859,516 | 11/1958 | McQueary | 30/151 |
| 3,857,176 | 12/1974 | Quenot | 30/162 |

*Primary Examiner*—Douglas D. Watts
*Attorney, Agent, or Firm*—Douglas L. Tschida

[57] ABSTRACT

A utility saw wherein the saw blade is mounted in retractable sliding relation within the saw handle. Blade exposure is controlled via a compressively acting lock nut assembly and a plurality of detents provided along the slide path. The handle also provides for extra blade storage, a belt carrying loop, folding hand guards, and a hammer member.

8 Claims, 7 Drawing Figures

_4,630,373_

RETRACTABLE UTILITY SAW

BACKGROUND OF THE INVENTION

The present invention relates to utility saws and in particular to a saw for use by sportsmen and others and wherein the saw blade mounts within the handle in a reciprocating fashion to permit a desired exposure of the blade.

In the above regard, a problem which has long plagued the sportsman and camper has been the unavailability of a light duty utility saw. That is, a saw is needed that is not only safe to use and light in weight, but one which is also able to withstand abuse, store in a relatively compact assembly and permit unobtrusive carrying so as to be available for needed occassions. For example, the deer hunter oftentimes finds himself or herself selecting a tree stand that requires brush or small tree limbs to be cleared. Moose and elk hunters similarly have a need for a utility saw to split the carcass of a downed animal and thereby facilitate cooling and prevent spoilage. Campers, likewise, oftentimes require small amounts of firewood, but the collection of which does not justify the added weight and inconvenience of carrying a bow saw or other presently available utility saws. Additionally, such a saw can be included as part of a survival kit.

While a host of different utility saws have been developed over the years for the camper and sportsman, they typically have been configured along the lines of conventional bow saws, folding saws, or composite takedown saws, not to forget string-type saws. Of the foregoing saw types, however, drawbacks are encountered with each. For example, the folding saw and which looks much like a large pocket knife, although incorporating a saw blade therein, requires a separate sheath to carry the saw and/or a backpack. Also and due to the permanent mounting of the blade, should the blade break or become dull, one must buy an entirely new saw. Bow-type saws, like the "Wyoming" saw and which also breaks down for storage, provide for replaceable blades, but due to their modular or piece-part construction, saw parts may be lost and a separate case is required to contain all the parts during transport. String saws, while easy to carry, are difficult to use.

One other utility saw type that Applicant is aware of is a utility hacksaw sold by the Stanley Tool Corporation. This saw comprises a molded handle section which is formed to receive and fixedly contain a conventional hacksaw blade therein, with a portion of the blade extending beyond the handle section. A rigid mounting is thus obtained and which permits the use of the saw in confined spaces, for example, when doing plumbing and heating repairs and where it is oftentimes necessary to cut pipes in spaces that do not permit the use of rotary pipe cutters. While the construction of this saw has proven its usefulness on the above occasions, its use by the sportsman is hampered by the exposed mounting of the saw blade. That is, the exposed mounting of the blade does not facilitate carrying in other than a tool box or sheath and disassembly still requires a separate case and/or the possibility of misplaced saw parts, when they are needed.

Applicant is also aware of various razor-type utility knives which provide for retractable blade mounting. Such knives, however, are not practical for the presently mentioned uses and are not intended to accommodate saw blades.

Recognizing, therefore, the need of the sportsman and the shortcomings of the foregoing saw types, Applicant has designed a self-contained, hand held reciprocating type saw blade mounting that provides adjustable blade exposure, along with spare blade storage in the handle section. A pair of handle guards also minimize against hand slippage, yet fold away during transport in a restrained fashion relative to the blade and handle. Additionally, a contained carrier loop facilitates carrying and which along with the overall saw size and weight, permits unobtrusive transport. The saw construction further facilitates the use of a variety of readily available blades of different sizes, tooth spacings and lengths to accommodate the user's particular needs.

The above objects, advantages and distinctions of the present invention as well as its construction will, however, become more apparent upon reference to the following description thereof with respect to the appended drawings. Before referring thereto, though, it is to be recognized that the following description is made by way of reference to the presently preferred embodiment only, along with various contemplated modifications, and thus is not intended to be all inclusive in its description. Accordingly, the following description should not in any way be interpreted to be self-limiting.

SUMMARY OF THE INVENTION

A utility saw for the sportsman wherein the saw blade is retractably mounted within a handle member, along with spare blades. The handle member includes a slide channel and lock nut assembly mounted to the blade, which in combination with a plurality of indentations along the blades's slide path permit a variety of blade exposures. A contained cavity within an opposed handle portion provides spare blade storage. The handle is also designed to accomodate a variety of reciprocating saw blade types.

An attached belt loop, along with a slim handle profile facilitate transport. A pair of folding hand guards further facilitate grasping during use and cooperatively interact with the retracted saw blade to prevent against undesired blade exposure during transport. It is also contemplated that a pounding member might be added to the handle to permit limited use as a hammer.

DESCRIPTION OF THE PREFERRED EMBODIMENT

Figure 1:
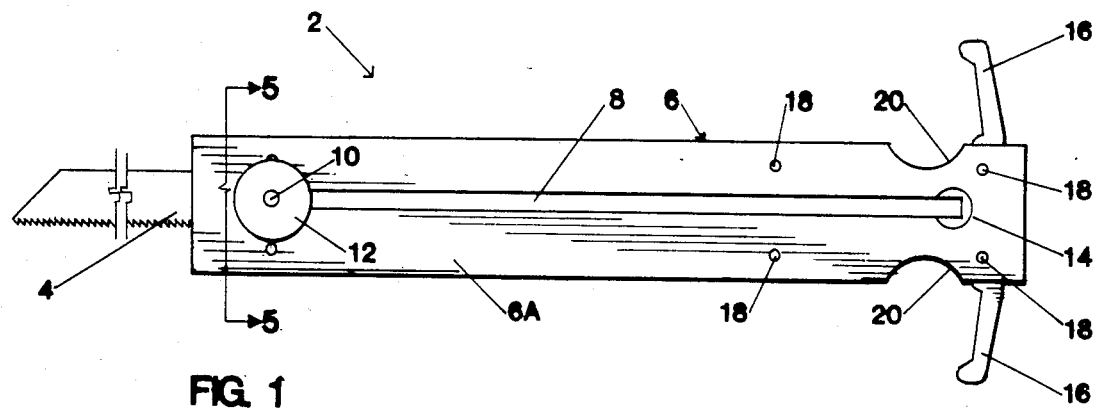
FIG. 1 shows a front view of the present utility saw with the blade in extended relation to the handle member.

Referring to FIG. 1, a front elevation view is shown of the present utility saw 2 and wherein the saw blade 4 is shown in its fully extended position. The saw 2 is constructed from machined aluminum and was readily available reciprocating saw blades. However, before describing the details of the saw 2's construction, and in spite of its present construction, it is presently contemplated that various portions of the saw 2 lend themselves to fabrication through injection molding processes and the like using impact resistant plastics. Thus, even though various of the following details are described with respect to the present metal fabrication, upon using other materials, it is to be recognized that various structural modifications may be required, but which are not deemed to fall without the level of those ordinarily skilled in the art.

Figure 5:
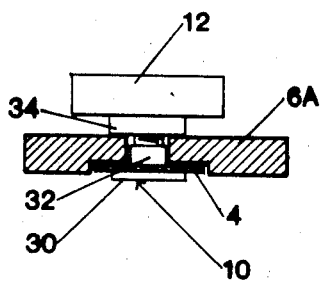
FIG. 5 shows a cross section view along section lines 5—5 of FIG. 1 of the lock nut assembly relative to the saw blade.

Returning attention to FIG. 1 and with attention also to FIG. 5, the handle 6, comprised of handle portions 6a and 6b, is constructed to permit a reciprocating mounting of the saw blade 4 therein. In this regard, a slot or slideway 8 is provided in the handle portion 6a and in relation to which a slide screw 10 is mounted through a hole (not shown) in the aft or proximal end (relative to the user) of the saw blade 4, through the slideway 8 and compressively secured to the handle portion 6a via an appropriately knurled, finger engageable nut 12. Thus, upon partially unscrewing the nut 12 from the screw 10, the saw blade 4 may be retracted into the handle 6 or extended therefrom in a reciprocating fashion, along the lengthwise axis of the slideway 8.

Depending therefore upon the rigidity of the saw blade and/or, for instance, the size of a branch to be cut, the exposure of the saw blade 4 can be adjusted as desired to meet the application, while minimizing against the possiblity of either blade breakage and/or potential bending. In order to further prevent against the potential slippage of the saw blade 4 relative to the handle 6, a plurality of stop recesses or detents 14 are formed in the exterior surface along the slideway 8 of the front handle portion 6a. In FIG. 1, only two recesses 14 are provided at the extreme ends of the blade 4's travel, but it is to be recognized that additional recesses may be let into the exterior surface of the handle 6a to provide additional stop points. The nut 12 is thus engagable in a desired one of the stop recesses 14, coinciding with a desired blade exposure, and which will prevent against blade slippage via the abuttment of an inner surface of the nut 12 within the recess 14. The details of which mounting will be described in greater detail hereinafter. Should the nut 12 loosen with use, the blade 4 would thereby be prevented from slipping. Upon detecting the loosened condition, and which typically is indicated via the vibration of the blade 4 relative to the handle 6, the operator need merely re-tighten the nut 12.

Pivotally mounted to the aft end of the handle 6 are a pair of hand guards 16 that individually pivot around one of the mounting screws 18 that pass through the back handle portion 6b, before being secured in threaded holes let into the front handle portion 6a. Upon exposing the blade, the hand guards 16 are released from an interlocked condition with the blade 4 and which permits the operator to rotate the guards 16 to the position shown. Indentations 20 are also let into the sides of the handle 6 to facilitate the rotation and storage of the guards 16 therein. When the handle 6 is therefore held in the hand, the projection of the guards 16 and the nut 12 from the surface of the handle constrain movement of the user's hands therebetween. In this fashion, potential injury such as might occur with hand slippage along the handle 6 is prevented.

Figure 2:
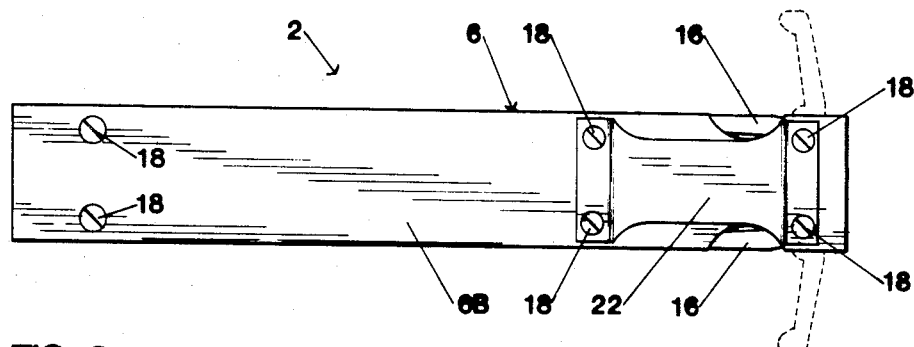
FIG. 2 shows a back view of the saw with the blade retracted and the hand grips folded.

Turning attention next to FIG. 2, a view is shown of the back of the saw 2 and wherein a better perspective is had relative to the mounting of the hand guards 16 thereto. From FIG. 2, the hand guards 16 are shown in their folded position, as well as in their extended position (shown in phantom line). Also more apparent are the mounting screws 18 which, as mentioned, pass through the back handle portion 6b, before being threadably secured in the front handle portion 6a. These screws 18 are mounted above and below the slide path of the blade 4 and secure the handle section 6a and 6b securely to one another along the lengthwise handle axis. In this fashion, the handle section 6a and 6b are prevented from splitting apart and also ensure that the blade is restrained between the screws 18, even if the screws 18 become loosened over time. Not as apparent but as important, it is to be noted that the opening (not shown) through the distal end of the handle 6 is kept as small as possible, without incurring blade binding, to prevent against blade twisting and provide support.

Also provided with the present saw 2 is a belt loop 22 that mounts adjacent the aft end of the saw 2 and which is secured thereto via four of the screws 18 and the right-most end two of which additionally act as the pivot pins for the handle grips 16. The advantageous retractable blade construction of the present saw 2, along with the belt loop 22, thus does away with the necessity of a separate sheath and facilitates the carrying of the saw 2 by the user in an unobtrusive fashion. In this latter regard, it is to be noted that dimensionally and when retracted, the saw 2 is approximately 11 inches long, two inches wide and ½ inch thick. Thus, it is no more obtrusive than any sheath knife, although providing obvious advantages thereover.

Figure 3:
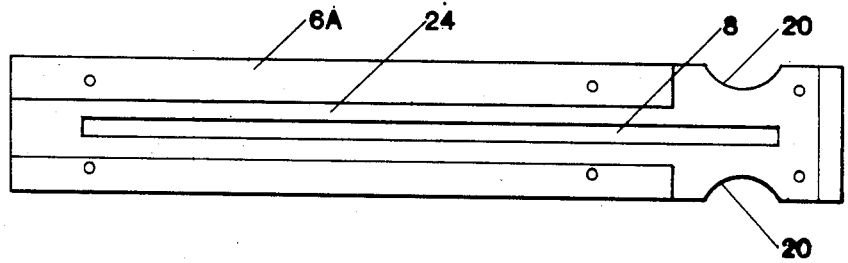
FIG. 3 shows an inside view of the front handle portion and the slide recess formed therein.
Figure 4:
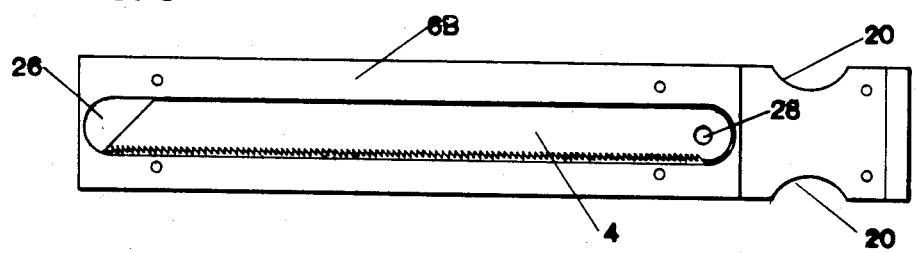
FIG. 4 shows an inside view of the back handle portion and the spare blade recess formed therein.

Turning attention next to FIGS. 3 and 4, respective views are shown of the inside surfaces of the front handle portion 6a and the back handle portion 6b. From FIG. 3, it is to be noted that a recess 24 extends from the left most end of the handle portion 6a and along the length of the slideway 8 to accommodate the travel of the blade 4 therein. The recess 24 thereafter continues into the hand guard area and facilitates the folded mounting of the handle grips 16.

FIG. 4, in turn, shows the spare blade cavity 26 and which essentially coincides in opposed relation to the recess 24. Also shown within the cavity 26 is a spare saw blade 4. In the present embodiment, only one additional saw blade is provided, although it is to be appreciated that by varying the thickness of the handle section 6b and the depth of the cavity 26, additional blades can be stored as desired. Also, because the cavity 26 is sized to accommodate the longest blade that may be used with the saw, it is to be appreciated that shorter blades may also be stored therein.

In the latter regard, the present saw 2 is constucted to accommodate use with readily available reciprocating saw blades. Such blades are constructed from a variety of different alloys that, in turn, provide varying amounts of usable life, along with different lengths and tooth spacings. Accordingly, new blades 4 are readily obtainable by the user. The only requirement is that the width of the blade 4 be no wider than the recess 24 and that the mounting hole 28 accommodate the lock screw 10.

Turning attention next to FIG. 5, a detailed assembly view is shown in cross section of the mounting of the locking nut 12 relative to a typical blade 4 and the locking screw 10. From FIG. 5, it is to be appreciated that the screw 10 provides for a relatively thin flat head portion 30 and an adjacent shoulder portion 32 that together are no wider than the thickness of the handle portion 6a in the area of the slideway 8 so as to permit the above-described slidable mounting within the recess 24. Also, it is to be noted that the nut 12 includes an inside annular portion 34 that extends inwardly toward the handle portion 6a and which it will be recalled, is received within the stop recesses 14.

Figure 6:
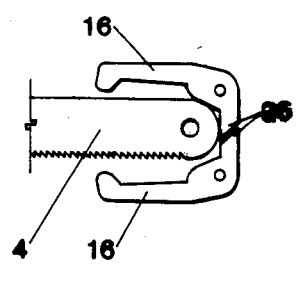
FIG. 6 shows a detailed view of the saw blade in retracted interlocking relation to the hand guards.

FIG. 6, in turn, discloses a detailed view of the relative mounting between the saw blade 4 and the L-shaped hand guards 16, when the blade is fully retracted. Specifically, it is to be noted that in the fully retracted position, the hand guards 16 are designed such that the blade 4 interlocks with the guards 16 to prevent against their inadvertent opening, when the saw 2 is not being used. Also, the tanged ends 36 are designed such that if the hand guards 16 are extended, upon retracting the blade 4 there against, the guards 16 are induced to rotate inwardly to their locked position. Thus, the user need not separately undertake to fold the guards 16, but rather only has to slide the nut 12 and blade 4 to the fully retracted position and whereupon the grips 16 fold inwardly upon themselves. This position is then maintained, upon securing the nut 12 within the right most stop recess 14.

Figure 7:
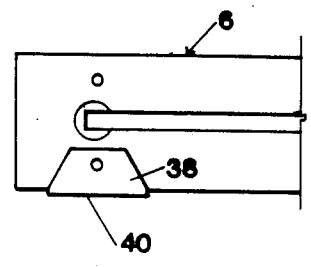
FIG. 7 shows a detailed view of a hammer member that may be included with the handle 6.

FIG. 7 lastly shows a detailed partial section view of an alternative embodiment of a plastic handle 6 wherein a metal member 38 having a hammer face 40 is secured to the distal end and side of the handle 6 via one of the screws 18. The screw 18 being secured within a threaded insert let into the handle portion 6a. In this fashion, the saw 2 may provide limited use as a hammer. It is also to be appreciated that the saw 2 of FIGS. 1 to 6, given its metallic construction, may also be used to serve this end, with or without the addition of a hammer member 38. Similarly, it is to be apprecaited that the saw 2 can be fabricated with or without the guards 16.

While the present invention has been described with respect to its presently preferred embodiment, it is to be appreciated that in addition to the mentioned modifications, still others might be suggested to those of skill in the art. It is accordingly contemplated that the following claims should be interpreted so as to include all those equivalent embodiments which fall within the spirit and scope thereof.

What is claimed is:

1. A hand utility saw comprising:
   a saw blade having a proximal and a distal end and including a plurality of saw teeth disposed along at least one edge thereof;
   an elongated handle comprising first and second handle portions, said first handle portion including a lengthwise saw blade receiving recess formed along an interior surface thereof and including a slot extending from the interior to the exterior of said first handle portion and coextensive over a portion of the length of said recess, said second handle portion including a lengthwise cavity formed therein for receiving at least one spare saw blade and wherein said recess and said cavity mount in opposed facing relation to one another;
   a screw member mounted through a hole formed in the proximal end of said saw blade and extending through said slot in sliding relation thereto;
   a lock nut threadably secured to said screw member and extending beyond the width of said slot so as to compressively secure said saw blade to said first handle portion, upon tightening said lock nut;
   a loop member mounted to an exterior surface of said handle and defining a passageway between an interior surface of said loop member and an exterior surface of said handle for receiving a belt therethrough; and
   first and second L-shaped hand guard members pivotally mounted to said handle along said saw blade receiving recess and cooperatively interacting with the proximal end of said saw blade upon retracting said saw blade into said handle to retract in folded relation said handle and otherwise selectively pivoting outwardly from said handle, upon exposing said saw blade therefrom.

2. A hand utility saw comprising:
   a saw blade having a proximal and a distal end and a plurality of saw teeth disposed along at least one edge thereof;
   an elongated handle comprising first and second handle portions, said first handle portion including a lengthwise extending saw blade receiving slideway recessed into an interior surface thereof and a slot through said first handle portion coextensive over a portion of and transverse to said slideway, said second handle portion including an interior blade storage cavity, and wherein said slideway and said storage cavity mount in opposed facing relation to one another;
   means mounted to said saw blade in said slideway and through said slot for securing said saw blade to said first handle portion, upon achieving a desired exposure of said saw blade from said handle.

3. Apparatus as set forth in claim 2 including a plurality of detents formed along the length of said handle and wherein said detents cooperatively interact with said securing means to provide predetermined amounts of non-slipping exposure of said saw blade.

4. Apparatus as set forth in claim 2 including a hammer member fixedly secured along the length of said handle.

5. A hand utility saw as set forth in claim 2 including:
   first and second L-shaped hand guard members, each having one end pivotally mounted interiorly of said handle along said slideway and cooperatively interacting with the proximal end of said saw blade upon retracting said saw blade into said handle to retract in folded relation to said handle and otherwise selectively pivoting outwardly from said handle, upon disengaging said saw blade therefrom.

6. A hand utility saw as set forth in claim 2 including a loop member mounted to an exterior surface of said handle for receiving a belt therethrough.

7. Apparatus as set forth in claim 5 including a loop member mounted to an exterior surface of said handle for receiving a belt therethrough.

8. A hand utility saw comprising:
   a saw blade having a proximal and a distal end and a plurality of saw teeth disposed along at least one edge thereof;
   an elongated handle comprising first and second handle portions, said first handle portion including a lengthwise extending saw blade receiving slideway recessed into an interior surface thereof and a slot through said first handle portion coextensive over a portion of and transverse to said slideway, said second handle portion including an interior blade storage cavity and wherein said slideway and said storage cavity mount in opposed facing relation to one another;

a stud member slidably mounted in said slideway through said slot and a hole in said saw blade;

first and second L-shaped hand guard members, each having one end pivotally mounted interiorly of said handle along said slideway and cooperatively interacting with the proximal end of said saw blade upon retracting said saw blade into said handle to retract in folded relation to said handle and otherwise selectively pivoting outwardly from said handle, upon exposing said saw blade therefrom;

means coupled to said stud for securing said saw blade to said first handle portion, upon achieving a desired exposure of said saw blade from said handle; and a plurality of detents formed along the length of said slot to cooperatively interact with said securing means to provide predetermined lengths of non-slipping exposure of said saw blade.

* * * * *